(12) United States Patent
Nichkawde et al.

(10) Patent No.: US 10,037,767 B1
(45) Date of Patent: Jul. 31, 2018

(54) INTEGRATED SYSTEM AND A METHOD OF IDENTIFYING AND LEARNING EMOTIONS IN CONVERSATION UTTERANCES

(71) Applicant: Wipro Limited, Bangalore (IN)

(72) Inventors: Chetan Nichkawde, Pune (IN); Vijay Garg, Pune (IN); Kartik Ballal, Pune (IN)

(73) Assignee: WIPRO LIMITED, Bangalore (IN)

( * ) Notice: Subject to any disclaimer, the term of this patent is extended or adjusted under 35 U.S.C. 154(b) by 21 days.

(21) Appl. No.: 15/461,200

(22) Filed: Mar. 16, 2017

(30) Foreign Application Priority Data

Feb. 1, 2017 (IN) .............................. 201741003798

(51) Int. Cl.
*G10L 15/22* (2006.01)
*G06F 17/27* (2006.01)
(Continued)

(52) U.S. Cl.
CPC ............ *G10L 25/63* (2013.01); *G06F 17/241* (2013.01); *G06F 17/2705* (2013.01); *G06F 17/277* (2013.01); *G06F 17/2735* (2013.01); *G06K 9/00288* (2013.01); *G06K 9/00302* (2013.01); *G06K 9/6259* (2013.01); *G06K 9/6262* (2013.01); *G06N 3/0445* (2013.01); *G06N 3/08* (2013.01); *G10L 15/16* (2013.01); *G10L 15/22* (2013.01); *G06K 2009/00328* (2013.01)

(58) Field of Classification Search
CPC .......... G10L 17/26; G10L 15/22; G06F 17/27
USPC ........................................... 704/9, 232, 236
See application file for complete search history.

(56) References Cited

U.S. PATENT DOCUMENTS 8,407,055 B2 * 3/2013 Asano ............... G06F 17/30026
704/231
9,299,268 B2 * 3/2016 Aravkin ................... G09B 5/04
(Continued)

OTHER PUBLICATIONS

Tokuhisa, R., et al., "Emotion classification using massive examples extracted from the web", *Proceedings of the 22nd International Conference on Computational Linguistics (Coling 2008)*, Aug. 2008, pp. 881-888.
(Continued)

*Primary Examiner* — Seong Ah A Shin
(74) *Attorney, Agent, or Firm* — Finnegan, Henderson, Farabow, Garrett & Dunner, LLP

(57) ABSTRACT

Systems and methods for identifying and learning emotions in conversation utterances are described. The system receives at least one of textual utterance data, audio utterance data and visual utterance data. A set of facial expressions are fetched from the visual utterance data. The system annotates the set of facial expressions with corresponding set of emotions using predictive modeling. Upon annotating, labelled data is generated by tagging the textual utterance data and the audio utterance data with the set of emotions. The labelled data along with non-labelled data is fed into self-learning model of the system. The non-labelled data is new textual utterance data. The self-learning model learns, from the labelled data, about the set of emotions. Further, the self-learning model also determines a new set of emotions corresponding to the new textual utterance data by using recurrent neural network. The self-learning model generates new labelled data and update itself accordingly.

18 Claims, 4 Drawing Sheets

(51) Int. Cl.
*G10L 25/63* (2013.01)
*G06F 17/24* (2006.01)
*G10L 15/16* (2006.01)
*G06K 9/00* (2006.01)
*G06K 9/62* (2006.01)
*G06N 3/04* (2006.01)
*G06N 3/08* (2006.01)

(56) References Cited

U.S. PATENT DOCUMENTS

| | | | | |
|---|---|---|---|---|
| 2003/0033145 A1* | 2/2003 | Petrushin | ............... | G10L 17/26 704/236 |
| 2011/0112826 A1* | 5/2011 | Wang | ............... | G06F 17/2785 704/9 |
| 2011/0294525 A1* | 12/2011 | Jonsson | ............... | G06F 17/27 455/466 |
| 2014/0212007 A1* | 7/2014 | Oh | ............... | G06F 17/214 382/119 |
| 2014/0328570 A1* | 11/2014 | Cheng | ............... | G11B 27/10 386/241 |
| 2016/0104486 A1* | 4/2016 | Penilla | ............... | H04L 67/12 704/232 |
| 2017/0200449 A1* | 7/2017 | Penilla | ............... | G10L 15/22 |
| 2018/0047391 A1* | 2/2018 | Baik | ............... | G10L 15/22 |

OTHER PUBLICATIONS

Li, W., et al., "Text-based emotion classification using emotion cause extraction", *Journal Expert Systems with Applications: An International Journal*, vol. 41, Issue 4, Mar. 2014, Abstract, pp. 1742-1749.

Yang, C., et al., "Emotion classification using web blog corpora", *IEEE/WIC/ACM International Conference on Web Intelligence*, pp. 275-278 (2007).

* cited by examiner ized System and a Method of
Identifying and Learning Emotions
in Conversation Utterances

TECHNICAL FIELD

The present disclosure relates in general to machine learning in online user assistance environment. More particularly, but not exclusively, the present disclosure discloses a method and system for identifying and learning emotions in conversation utterances.

BACKGROUND

Online user assistance is one of a useful technique for handling online user queries. In the online user assistance environment, users input their queries which are addressed by an online user assistance system. The aim of such system is to provide a user-friendly and human like assistance for the online users. To provide such user-friendly assistance, an important requirement is to understand the query as well as user's emotional state. During the interaction with the system, the user may show a wide variety of emotions. Understanding all the emotions with help of textual or audio input is a challenging task.

To help the system understand the emotions, a huge data set is required, in which, number of texts and phrases are tagged with their corresponding emotional state. Thus, the system get trained with this tagged information and responds appropriately while interacting with the online users. However, such huge data set are not always available, and therefore, causes error in responding to the user queries and effects overall performance of the system while responding to the user-queries.

SUMMARY

Accordingly, the present disclosure relates to a method of identifying and learning emotions in conversation utterances. The method comprises the steps of receiving at least one of textual utterance data, audio utterance data and visual utterance data. The method further comprises fetching a set of facial expressions from the visual utterance data. Further, the method comprises annotating the set of facial expressions with corresponding set of emotions using predictive modeling. The method further comprises a step of generating labelled data by tagging at least one of the textual utterance data and the audio utterance data with the set of emotions based on the set of facial expressions. Further, the method comprises providing the labelled data and non-labelled data to a self-learning model of the integrated system. The non-labelled data comprises new textual utterance data received from a user. Further, the self-learning model learns, from the labelled data, about the set of emotions tagged with the textual utterance data. The self-learning model further determines a new set of emotions corresponding to the new textual utterance data by using at least one of type of a recurrent neural network (RNN). Further, the self-learning model generates new labelled data by tagging the new textual utterance data with the new set of emotions. The self-learning model further integrates the new labelled data into the self-learning model, thereby updating the self-learning model.

Further, the present disclosure relates to an integrated system for identifying and learning emotions in conversation utterances. The integrated system comprises a processor and a memory communicatively coupled to the processor. The memory stores processor-executable instructions, which, on execution, causes the processor to perform one or more operations comprising receiving at least one of textual utterance data, audio utterance data and visual utterance data. Further, the system fetches a set of facial expressions from the visual utterance data. The system further annotates the set of facial expressions with corresponding set of emotions using predictive modeling. Further, the system generates labelled data by tagging at least one of the textual utterance data and the audio utterance data with the set of emotions based on the set of facial expressions. Further, the system provides the labelled data and non-labelled data to a self-learning model of the integrated system. The non-labelled data comprises new textual utterance data received from a user. Further, the self-learning model learns, from the labelled data, about the set of emotions tagged with the textual utterance data. The self-learning model further determines a new set of emotions corresponding to the new textual utterance data by using at least one of type of a recurrent neural network (RNN). Further, the self-learning model generates new labelled data by tagging the new textual utterance data with the new set of emotions. The self-learning model further integrates the new labelled data into the self-learning model, thereby updating the self-learning model.

Furthermore, the present disclosure relates to a non-transitory computer readable medium including instructions stored thereon that when processed by at least one processor cause an integrated system to perform the acts of receiving at least one of textual utterance data, audio utterance data and visual utterance data. Further, the integrated system fetches a set of facial expressions from the visual utterance data. The integrated system further annotates the set of facial expressions with corresponding set of emotions using predictive modeling. Further, the integrated system generates labelled data by tagging at least one of the textual utterance data and the audio utterance data with the set of emotions based on the set of facial expressions. Further, the integrated system provides the labelled data and non-labelled data to a self-learning model of the integrated system. The non-labelled data comprises new textual utterance data received from a user. Further, the self-learning model learns, from the labelled data, about the set of emotions tagged with the textual utterance data. The self-learning model further determines a new set of emotions corresponding to the new textual utterance data by using at least one of type of a recurrent neural network (RNN). Further, the self-learning model generates new labelled data by tagging the new textual utterance data with the new set of emotions. The self-learning model further integrates the new labelled data into the self-learning model, thereby updating the self-learning model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
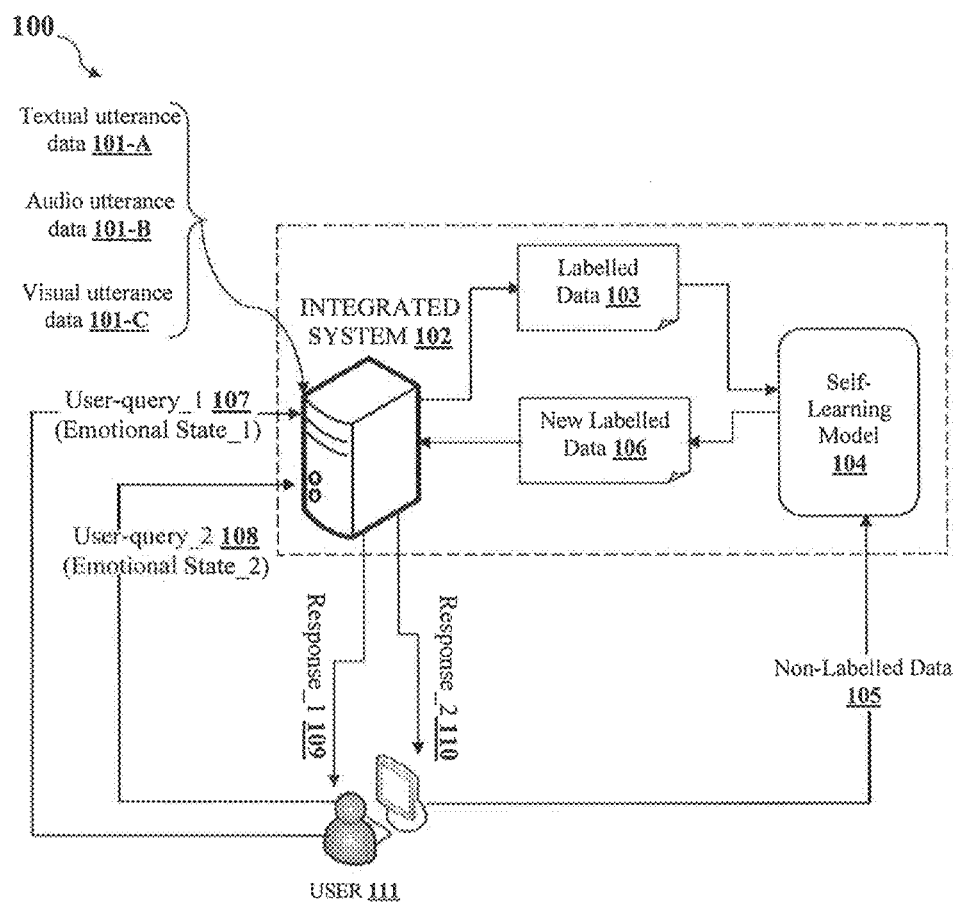
FIG. 1 shows an exemplary environment illustrating an integrated system for identifying and learning emotions in conversation utterances in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an integrated system (alternatively also referred as "system") for identifying and learning emotions in conversation utterances. Although, the method for identifying and learning emotions is described in conjunction with a server, the said method can also be implemented in various computing systems/devices, other than the server. In an online user assistance environment, a number of online users with different moods and emotions interacts with the system. The system assist the online users in solving their queries. There may be different modes of interaction between the online users and the system. In one example, the online user may ask a user query using a keyboard of a user device i.e., textual input or textual utterance data. In another example, the online user may ask the user query through an audio means like a microphone i.e., audio input or audio utterance data. Yet, in another example, the online user may ask the user query through visual means like a camera i.e., visual utterance data.

Once the query is received in any of the above modes, the next task of the system is to understand the received query. For understanding the query, the system may utilize various text analytics technique. In case the received query is in the voice format, the system may utilize speech-to-text processor for converting the audio input into textual format. Then, the text analytics technique may be applied upon the textual format to understand the query. However, only understanding the query is not sufficient for appropriately providing the response. The system must also understand emotion of the user before responding to the user queries.

Conventionally, the system understands about the emotional state of the user by using a huge set of tagged data which is received from an external source. That is, a predefined text/phrases mapped with their corresponding emotions are fed into the system. The system uses the fed information for understanding the emotional state of the online users. However, it is not always possible to provide such huge data to the system at regular interval of time to keep the system updated about new or possible emotional states of the online users. Thus, the conventional system has to depend on such external data, and hence the performance of such conventional system get effected.

To overcome this dependency and performance issue, the present disclosure discloses the system which itself generates the labelled data and automatically learns from the self-generated labelled data about the emotions of the user. This way, the dependency on the external source for receiving the external labelled data is eliminated. This makes the system robust and efficient, since the system do not have to wait for any external labelled data.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating an integrated system for identifying and learning emotions in conversation utterances.

The environment 100 includes textual utterance data 101-A, audio utterance data 101-B and visual utterance data 101-C, the integrated system 102, labelled data 103, self-learning model 104, non-labelled data 105, new labelled data 106, user-query_1 107 (having emotional state_1), user-query_2 108 (having emotional state_2), response_1 109, response_2 110, and a user 111.

The integrated system 102 receives at least one of the textual utterance data 101-A, the audio utterance data 101-B and the visual utterance data 101-C from an external source. Post receiving the utterance data (101-A, 101-B, 101-C), the system 102 may fetch facial expressions from the visual utterance data 101-C and annotate the facial expressions with corresponding emotions using predictive modelling. Further, the system 102 may generate labelled data 103 by tagging at least one of the textual utterance data 101-A and the audio utterance data 101-B with the corresponding emotions based on the facial expressions. The labelled data 103 may be further provided to self-learning model 104.

The self-learning model 104 may be implemented as a hardware element like a circuit or chip or a processor. The self-learning model 104 may simultaneously learn, from the labelled data 103, about emotions and also generates new labelled data 106 for future learning, which is explained in detail in subsequent paragraphs of the disclosure. Based on the learning, the system 102 may appropriately respond to user-queries by understanding the query as well as the current emotional state of the user 111.

Figure 2:
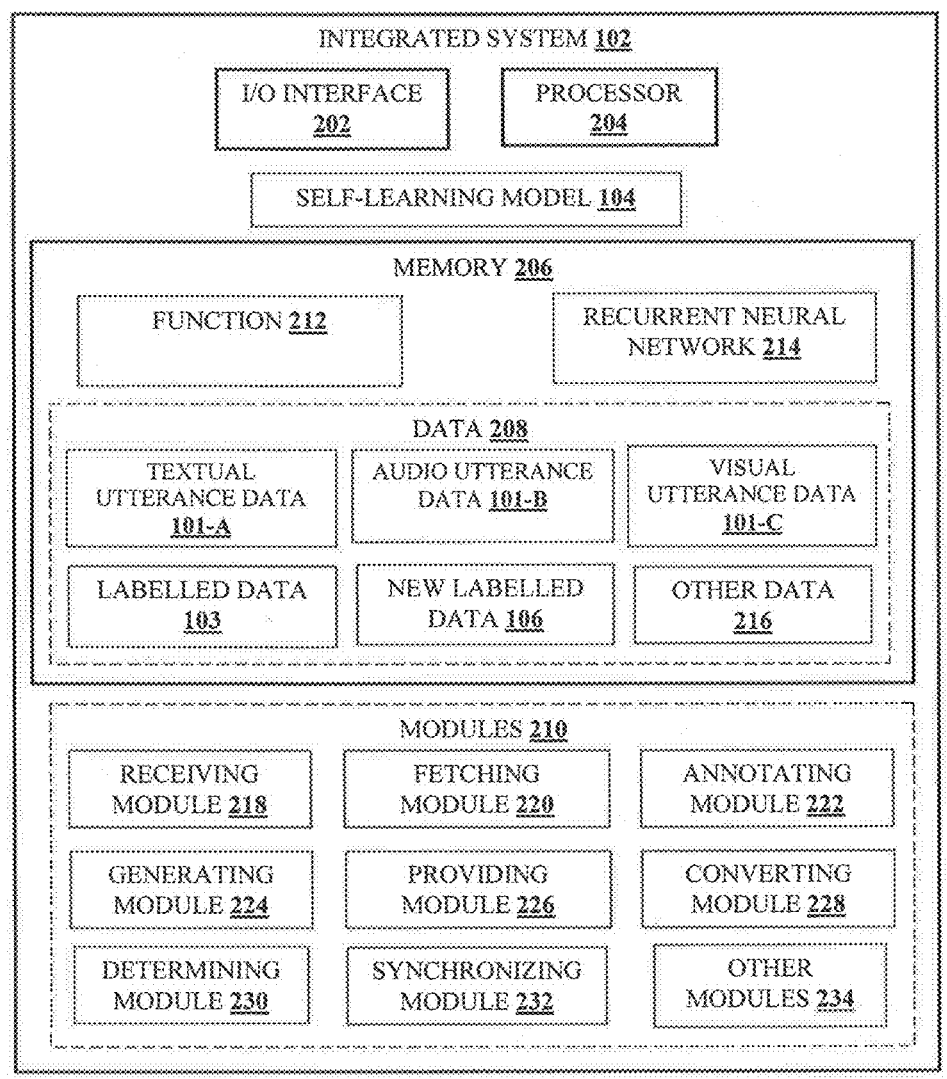
FIG. 2 shows a detailed block diagram illustrating the integrated system in accordance with some embodiments of the present disclosure.

FIG. 2 shows a detailed block diagram illustrating the integrated system in accordance with some embodiments of the present disclosure.

The integrated system 102 comprises an I/O interface 202, a processor 204, self-learning model 104, and a memory 206. The I/O interface 202 is configured to receive at least one of the textual utterance data 101-A, audio utterance data 101-B and visual utterance data 101-C from an external source. The memory 206 is communicatively coupled to the processor 204. The processor 204 is configured to perform one or more functions of the integrated system 102 for identifying and learning emotions in conversation utterances. In one implementation, the integrated system 102 comprises data 208 and modules 210 for performing various operations in accordance with the embodiments of the present disclosure. The memory 206 further comprises a function 212 and recurrent neural network (RNN) 214. In an embodiment, the data 208 may include, without limitation, the textual utterance data 101-A, the audio utterance data 101-B, the visual utterance data 101-C, labelled data 103, non-labelled data 105, and other data 216.

In one embodiment, the data 208 may be stored within the memory 206 in the form of various data structures. Additionally, the aforementioned data 208 can be organized using data models, such as relational or hierarchical data models. The other data 216 may store data, including temporary data and temporary files, generated by modules 210 for performing the various functions of the integrated system 102.

In an embodiment, the function 212 may be a SoftMax function capable of outputting a likelihood of different emotions based on the utterance data received during the conversation. In an embodiment, the self-learning model 104 may be implemented as a hardware element like a circuit or chip or a processor which continuously learns from the labelled data 103.

In an embodiment, the data 208 may be processed by one or more modules 210. In one implementation, the one or more modules 210 may also be stored as a part of the processor 204. In an example, the one or more modules 210 may be communicatively coupled to the processor 204 for performing one or more functions of the integrated system 102.

In one implementation, the one or more modules 210 may include, without limitation, a receiving module 218, a fetching module 220, an annotating module 222, a generating module 224, a providing module 226, a converting module 228, a determining module 230, a synchronizing module 232, and other modules 234. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the receiving module 218 may receive at least one of the textual utterance data 101-A, the audio utterance data 101-B and the visual utterance data 101-C from an external source. For example, the textual utterance data 101-A may be input through an input means (e.g., keyboard) of a user device connected with the integrated system 102. Further, the audio utterance data 101-B may be input through an audio input means (e.g., microphone and the like) of the user device connected with the integrated system 102. Further, the visual utterance data 101-C may be input through an image capturing unit (e.g., camera and the like) of the user device connected with the integrated system 102. Out of the above utterance data (101-A, 101-B, 101-C), the generating module 224 may utilize the visual utterance data 101-C for generating labelled data 103.

In an embodiment, the fetching module 220 of the system 102 may fetch a set of facial expressions from the visual utterance data 101-C. Since, the facial expression may reveal about user's thinking or the user's mood, it can be used for determining the emotion of the user 111. In the next step, the annotating module 222 of the integrated system 102 may annotate the set of facial expressions with corresponding set of emotions using predictive modeling technique. It will be understood by a person skilled in art that the predictive modeling may comprise neutral network which is used for annotating the set of facial expressions with the corresponding set of emotions.

Post annotation, the generating module 224 of the integrated system 102 may generate labelled data 103 by tagging the textual utterance data 101-A with the set of emotions based on the set of facial expressions. In case of the audio utterance data 101-B, it is first converted into textual format by the converting module 228 using speech-to-text convertor. Then, the generating module 224 may generate labelled data 103 by tagging the textual format of the audio utterance data 101-B with the corresponding set of emotions based on the set of facial expressions. This way, the integrated system 102 may generate its own labelled data 103, and hence do not have to depend upon any external source for receiving the labelled data 103.

Now, the providing module 226 of the integrated system 102 may provide or feed the labelled data 103 into the self-learning model 104. As discussed earlier, the self-learning model 104 may be a hardware implementation of machine learning which is capable of learning, from the labelled data 103, about the set of emotions tagged with the textual utterance data 101-A and textual format of the audio utterance data 101-B. At this stage, although the integrated system 102 do not have to depend upon the external source for the labelled data 103, however, the set of emotions learned from the labelled data 103 may not be sufficient for responding to the user queries having new emotions. So, to keep the integrated system 102 robust and updated, the self-learning model 104 continues the learning process by evaluating new utterances, which is explained here in detail.

When the new utterances are received i.e., the non-labelled data 105, the providing module 226 may provide or feed the non-labelled data 105 into the self-learning model 104. Since, the non-labelled data 105 includes new utterances i.e., new textual utterance data received from a user 111, the self-learning model 104 may determine new set of emotions corresponding to the new textual utterance data by performing various steps as described here in detail.

| Words | Numerical token |
| --- | --- |
| I | 20 |
| am | 73 |
| extremely | 54378 |
| elated | 543857 |
| with | 546754 |
| the | 5649 |
| resolution | 5784 |
| to | 76594 |
| the | 2393 |
| issue | 4300 |

In first step, the integrated system 102 may split the new textual utterance data into a plurality of words. The plurality of words is further tokenized by the integrated system 102. That is, the integrated system 102 may map the plurality of words with a corresponding plurality of numerical tokens using a pre-stored dictionary. An example of such mapping is shown in below table 1 for the textual utterance "I am extremely elated with the resolution to the issue".

Table 1: Mapping of the Words with Corresponding Numerical Token

From the above table 1, it can be observed that the plurality of words, of the textual utterance i.e., "I am extremely elated with the resolution to the issue", is mapped with their corresponding numerical tokens using the dictionary stored in the memory of the integrated system 102. After the mapping of the plurality of words, the integrated system 102 may provide or feed the plurality of numerical tokens into the self-learning model 104. Now, the self-learning model 104 may embed the plurality of numerical tokens into a real-valued vector space (R-vector space). According to embodiments, R-vector space may drive a gated recurrent unit (GRU) i.e., one of a type of recurrent neural network RNN 214. The GRU may encode the plurality of words (new textual utterance) within the internal state of its neurons. The information embedded into the temporal arrangement of the plurality of words may be used by the self-learning model 104. Thus, the self-learning model 104 may identify the meaning of the plurality of words represented by the plurality of numerical tokens by applying the GRU upon the plurality of numerical tokens. According to embodiments, the other type of the RNN which may be used is a long short term memory (LSTM) network.

Now, the self-learning model 104 may determine the new set of emotions corresponding to the plurality of words by using a function 212 enabled to determine one or more emotions from the conversation utterances. The function 212 may include a Softmax function which outputs the most likely emotion which may be exhibited by the user 111 during the interaction. According to an embodiment, an array of highway layer (and not traditional neural layers) may be stacked in front of the GRU and the emotional state of the new textual utterance may be inferred by the Softmax function. According to an embodiment, the integrated system 102 may use a regularization scheme which assimilate or integrate any non-labelled data 105 or non-labelled utterances for enriching the self-learning model 104. According to the regularization scheme, the Kullback-Leibler divergence may be used along with the Softmax function for determining the new set of emotions.

Once the new set of emotions are determined, the self-learning model 104 may generate new labelled data 106 by tagging the new textual utterance data with the new set of emotions. Thus, the new labelled data 106 is integrated with the self-learning model 104, thereby updating the self-learning model 104. This way, the self-learning model 104 continuously learns about the user's emotions and keep the integrated system 102 updated and robust for responding to the user queries.

Further, the synchronizing module 232 of the integrated system 102 may synchronize the self-learning model 104 into a virtual assistant (not shown in figure). The virtual assistant may be a computer-generated animated character adapted to intuitively respond to a user-query in one or more gestures based on emotional state of the user 111. The emotional state is determined by using the self-learning model 104. Further, the response to the user-query may be provided in at least one of an emotive text, audio response and one or more emoticons.

For example, at the time of online user assistance, the user 111 may ask query i.e., user query_1 107 with an emotional state_1 (for example, Joy—feeling happy). Then, the integrated system 102 may generate a response_1 109, considering the emotional state_1, for the user query_1 107. The content of the response_1 109 may match with emotional state of the user 111. However, according to another example, the user 111 may ask a query i.e., user query_2 108 with an emotional state of "sadness" (emotional state_2). Now, in this case, the integrated system 102 understand the user's emotional state by using the self-learning model 104 and may provide a sympathy message in the response_2 110. This way, based on the current emotional state of the user 111, the integrated system 102 may appropriately generate the response which provides human-like and user-friendly environment to the user 111.

Figure 3:
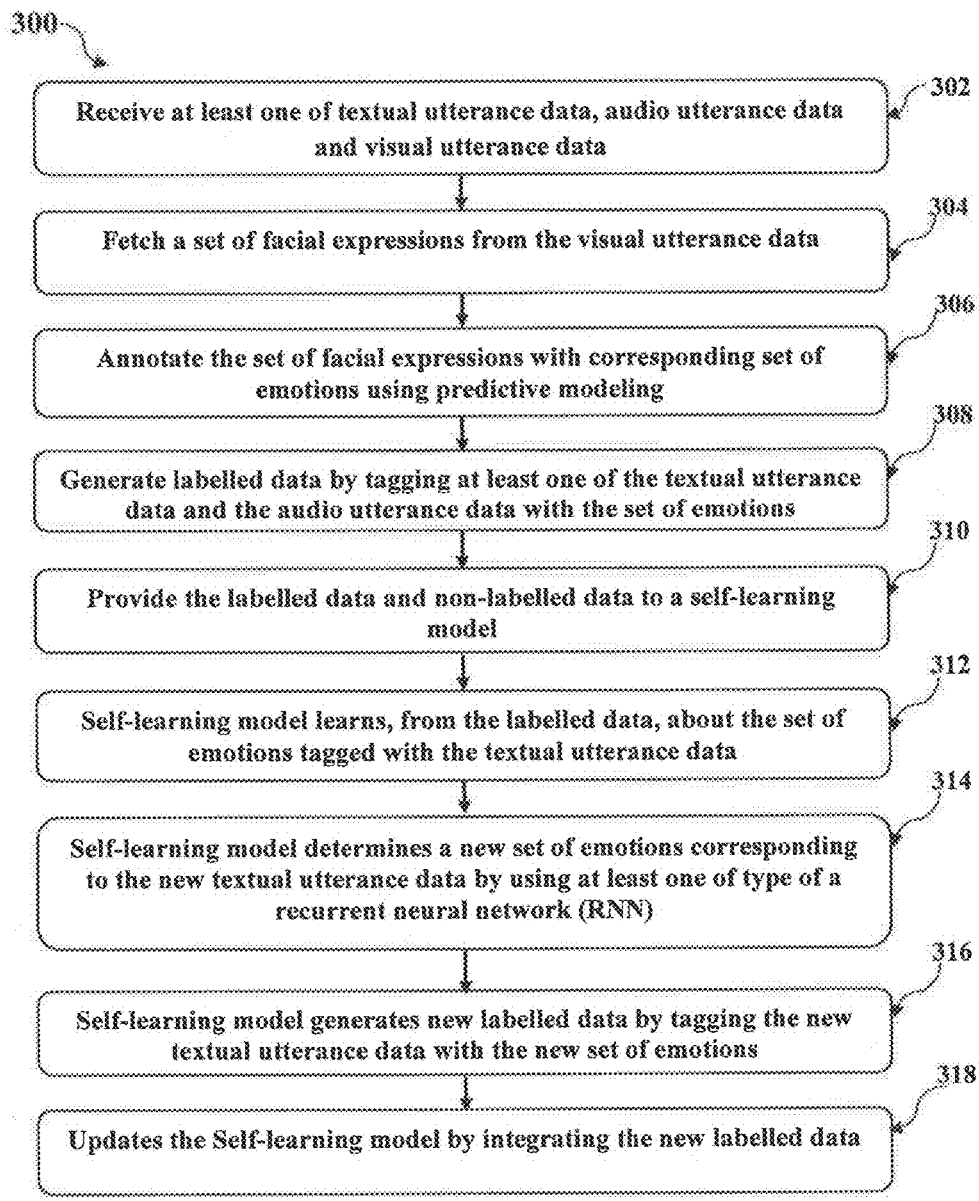
FIG. 3 shows a flowchart illustrating a method of identifying and learning emotions in conversation utterances in accordance with some embodiments of the present disclosure.

FIG. 3 shows a flowchart illustrating a method of identifying and learning emotions in conversation utterances with some embodiments of the present disclosure.

As illustrated in FIG. 3, the method 300 comprises one or more blocks for identifying and learning emotions in conversation utterances using an integrated system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the integrated system 102 receives at least one of textual utterance data 101-A, audio utterance data 101-B and visual utterance data 101-C.

At block 304, the integrated system 102 fetches a set of facial expressions from the visual utterance data 101-C.

At block 306, the integrated system 102 annotates the set of facial expressions with corresponding set of emotions using predictive modeling.

At block 308, the integrated system 102 generates labelled data 103 by tagging at least one of the textual utterance data 101-A and the audio utterance data 101-B with the set of emotions based on the set of facial expressions.

At block 310, the integrated system 102 provides the labelled data 103 and non-labelled data 105 to a self-learning model 104. The non-labelled data 105 comprises new textual utterance data received from a user 111.

At block 312, the self-learning model 104 of the integrated system 102 learns, from the labelled data 103, about the set of emotions tagged with the textual utterance data.

At block 314, the self-learning model 104 of the integrated system 102 determines a new set of emotions corresponding to the new textual utterance data by using at least one of type of a recurrent neural network (RNN) 214. The type of the RNN includes gated recurrent unit (GRU) or a long short term memory (LSTM) network.

At block 316, the self-learning model 104 of the integrated system 102 generates new labelled data 106 by tagging the new textual utterance data with the new set of emotions.

At block 318, the self-learning model 104 of the integrated system 102 updates itself by integrating the new labelled data 106.

Computer System

Figure 4:
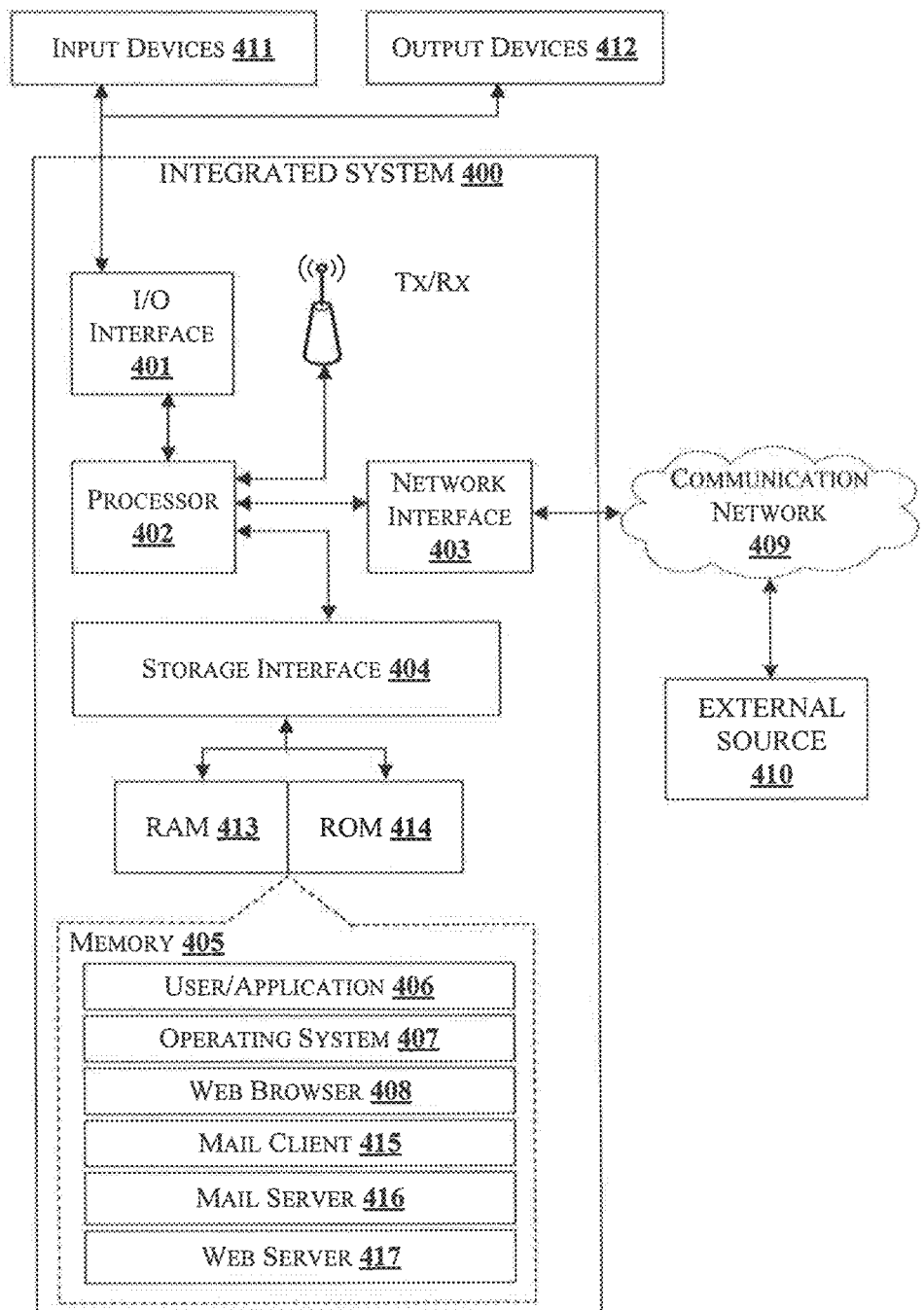
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the integrated system 102 which is used for identifying and learning emotions in conversation utterances. According to an embodiment, the computer system 400 may receive at least one of textual utterance data 101-A, audio utterance data 101-B and visual utterance data 101-C from an external source 410. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/ 7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method of learning about the emotions based on self-generated labelled data.

In an embodiment, the method of present disclosure eliminates the dependency on the external sources for labelled data.

In an embodiment, the present disclosure provides a continuous learning environment, in which, the system's maturity in understanding the emotions grows over the time.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | ENVIRONMENT |
| 101-A | TEXTUAL UTTERANCE DATA |
| 101-B | AUDIO UTTERANCE DATA |
| 101-C | VISUAL UTTERANCE DATA |
| 102 | INTEGRATED SYSTEM |
| 103 | LABELLED DATA |
| 104 | SELF-LEARNING MODEL |
| 105 | NON-LABELLED DATA |
| 106 | NEW LABELLED DATA |
| 107 | USER QUERY_1 |
| 108 | USER QUERY_2 |
| 109 | RESPONSE_1 |
| 110 | RESPONSE_2 |
| 111 | USER |
| 202 | I/O INTERFACE |
| 204 | PROCESSOR |
| 206 | MEMORY |
| 208 | DATA |
| 210 | MODULES |
| 212 | FUNCTION |
| 214 | RECURRENT NEURAL NETWORK (RNN) |
| 216 | OTHER DATA |
| 218 | RECEIVING MODULE |
| 220 | FETCHING MODULE |
| 222 | ANNOTATING MODULE |
| 224 | GENERATING MODULE |
| 226 | PROVIDING MODULE |
| 228 | CONVERTING MODULE |
| 230 | DETERMINING MODULE |
| 232 | SYNCHRONIZING MODULE |
| 234 | OTHER MODULES |

The invention claimed is:

1. An integrated system for identifying and learning emotions in conversation utterances, the system comprising:
    a processor; and
    a memory communicatively coupled to the processor, wherein the memory stores processor-executable instructions, which, on execution, causes the processor to:
        receive textual utterance data, audio utterance data and visual utterance data;
        fetch a set of facial expressions from the visual utterance data;
        annotate the set of facial expressions with corresponding set of emotions using predictive modeling;

generate labelled data by tagging at least one of the textual utterance data and the audio utterance data with the set of emotions based on the set of facial expressions;

provide the labelled data and non-labelled data to a self-learning model of the integrated system, wherein the non-labelled data comprises new textual utterance data received from a user, and wherein the self-learning model, learns, from the labelled data, about the set of emotions tagged with the textual utterance data, determines a new set of emotions corresponding to the new textual utterance data by using at least one of type of a recurrent neural network (RNN), generates new labelled data by tagging the new textual utterance data with the new set of emotions, and integrates the new labelled data into the self-learning model, thereby updating the self-learning model; and convert the audio utterance data into corresponding textual utterance data by using speech-to-text translation.

2. The method as claimed in claim 1, wherein the new set of emotions are determined by:

splitting, by the integrated system, the new textual utterance data into a plurality of words;

mapping, by the integrated system, the plurality of words with a corresponding plurality of numerical tokens using a pre-stored dictionary;

providing, by the integrated system, the plurality of numerical tokens into the self-learning model, wherein the self-learning model, embeds the plurality of numerical tokens into a real-valued vector space (R-vector space), identifies meaning of the plurality of words represented by the plurality of numerical tokens by applying the at least one of type of the RNN upon the plurality of numerical tokens, and determines the new set of emotions corresponding to the plurality of words by using a function enabled to determine one or more emotions from the conversation utterances.

3. The method as claimed in claim 1, wherein the at least one of type of the RNN comprises at least one of a gated recurrent unit (GRU) and a long short term memory (LSTM) network.

4. The method as claimed in claim 1, further comprising synchronizing the self-learning model into a virtual assistant.

5. The method as claimed in claim 4, wherein the virtual assistant is a computer-generated animated character adapted to intuitively respond to a user-query in one or more gestures based on emotional state of the user, wherein the emotional state is determined by using the self-learning model.

6. The method as claimed in claim 5, wherein the response to the user-query is provided in at least one of an emotive text, audio response and one or more emoticons.

7. A non-transitory computer-readable storage medium including instructions stored thereon that when processed by at least one processor cause an integrated system to perform operations comprising:

receiving textual utterance data, audio utterance data and visual utterance data;

fetching a set of facial expressions from the visual utterance data;

annotating the set of facial expressions with corresponding set of emotions using predictive modeling;

generating labelled data by tagging at least one of the textual utterance data and the audio utterance data with the set of emotions based on the set of facial expressions;

providing the labelled data and non-labelled data to a self-learning model of the integrated system, wherein the non-labelled data comprises new textual utterance data received from a user, and wherein the self-learning model, learns, from the labelled data, about the set of emotions tagged with the textual utterance data, determines a new set of emotions corresponding to the new textual utterance data by using at least one of type of a recurrent neural network (RNN), generates new labelled data by tagging the new textual utterance data with the new set of emotions, and integrates the new labelled data into the self-learning model, thereby updating the self-learning model; and converting the audio utterance data into corresponding textual utterance data by using speech-to-text translation.

8. The integrated system as claimed in claim 7, wherein the processor determines the new set of emotions by:

splitting the new textual utterance data into a plurality of words;

mapping the plurality of words with a corresponding plurality of numerical tokens using a pre-stored dictionary;

providing the plurality of numerical tokens into the self-learning model, wherein the self-learning model, embeds the plurality of numerical tokens into a real-valued vector space (R-vector space), identifies meaning of the plurality of words represented by the plurality of numerical tokens by applying the at least one of type of the RNN upon the plurality of numerical tokens, and determines the new set of emotions corresponding to the plurality of words by using a function enabled to determine one or more emotions from the conversation utterances.

9. The integrated system as claimed in claim 7, wherein the at least one of type of the RNN comprises at least one of a gated recurrent unit (GRU) and a long short term memory (LSTM) network.

10. The integrated system as claimed in claim 7, wherein the processor is further configured to synchronize the self-learning model into a virtual assistant.

11. The integrated system as claimed in claim 10, wherein the virtual assistant is a computer-generated animated character adapted to intuitively respond to a user-query in one or more gestures based on emotional state of the user, wherein the emotional state is determined by using the self-learning model.

12. The integrated system as claimed in claim 11, wherein the response to the user-query is provided in at least one of an emotive text, audio response and one or more emoticons.

13. A non-transitory computer-readable storage medium including instructions stored thereon that when processed by at least one processor cause an integrated system to perform operations comprising:

receiving textual utterance data, audio utterance data and visual utterance data;

fetching a set of facial expressions from the visual utterance data;

annotating the set of facial expressions with corresponding set of emotions using predictive modeling;
generating labelled data by tagging at least one of the textual utterance data and the audio utterance data with the set of emotions based on the set of facial expressions;
providing the labelled data and non-labelled data to a self-learning model of the integrated system, wherein the non-labelled data comprises new textual utterance data received from a user, and wherein the self-learning model,
  learns, from the labelled data, about the set of emotions tagged with the textual utterance data,
  determines a new set of emotions corresponding to the new textual utterance data by using at least one of type of a recurrent neural network (RNN),
  generates new labelled data by tagging the new textual utterance data with the new set of emotions, and
  integrates the new labelled data into the self-learning model, thereby updating the self-learning model; and
converting the audio utterance data into corresponding textual utterance data by using speech-to-text translation.

14. The medium as claimed in claim 13, wherein the instructions further cause the at least processor to determine the new set of emotions by:
  splitting the new textual utterance data into a plurality of words;
  mapping the plurality of words with a corresponding plurality of numerical tokens using a pre-stored dictionary;
  providing the plurality of numerical tokens into the self-learning model, wherein the self-learning model,
    embeds the plurality of numerical tokens into a real-valued vector space (R-vector space),
    identifies meaning of the plurality of words represented by the plurality of numerical tokens by applying the at least one of type of the RNN upon the plurality of numerical tokens, and
    determines the new set of emotions corresponding to the plurality of words by using a function enabled to determine one or more emotions from the conversation utterances.

15. The medium as claimed in claim 13, wherein the at least one of type of the RNN comprises at least one of a gated recurrent unit (GRU) and a long short term memory (LSTM) network.

16. The medium as claimed in claim 13, wherein the instructions further cause the at least processor to synchronize the self-learning model into a virtual assistant.

17. The medium as claimed in claim 16, wherein the virtual assistant is a computer-generated animated character adapted to intuitively respond to a user-query in one or more gestures based on emotional state of the user, wherein the emotional state is determined by using the self-learning model.

18. The medium as claimed in claim 17, wherein the response to the user-query is provided in at least one of an emotive text, audio response and one or more emoticons.

* * * * *